US012695320B2

(12) United States Patent
Chang et al.

(10) Patent No.: US 12,695,320 B2
(45) Date of Patent: Jul. 28, 2026

(54) WALL OF A BUILDING INCLUDING A WATER SUPPLY UNIT FOR A PLURALITY OF POWER UNITS

(71) Applicant: JOULES MILES CO., LTD., Kaohsiung City (TW)

(72) Inventors: Kuang-Yu Chang, Kaohsiung City (TW); Tao-Cheng Wu, Kaohsiung City (TW)

(73) Assignee: Joules Miles Co., Ltd., Kaohsiung City (TW)

( * ) Notice: Subject to any disclaimer, the term of this patent is extended or adjusted under 35 U.S.C. 154(b) by 916 days.

(21) Appl. No.: 18/048,150

(22) Filed: Oct. 20, 2022

(65) Prior Publication Data

US 2023/0399846 A1     Dec. 14, 2023

(30) Foreign Application Priority Data

Jun. 14, 2022    (TW) ................................. 111122025

(51) Int. Cl.
*H02J 7/65*          (2026.01)
*E04B 1/94*          (2006.01)
(Continued)

(52) U.S. Cl.
CPC .................. *H02J 7/65* (2026.01); *E04B 1/94* (2013.01); *E04C 2/46* (2013.01); *E04C 2/521* (2013.01);
(Continued)

(58) Field of Classification Search
CPC ...... H02J 7/00309; H02J 7/007; H02J 7/0047; H02J 7/342; H02J 9/06; H02J 7/65;
(Continued)

(56) References Cited

U.S. PATENT DOCUMENTS

| | | | | |
|---|---|---|---|---|
| 10,298,034 | B2 * | 5/2019 | Lei ........................... | H02J 7/663 |
| 2016/0006299 | A1 * | 1/2016 | Myhre ................... | H02J 9/061 |
| | | | | 307/66 |

(Continued)

FOREIGN PATENT DOCUMENTS

| | | | |
|---|---|---|---|
| CN | 102709616 A | * | 10/2012 |
| CN | 204225518 U | | 3/2015 |

(Continued)

OTHER PUBLICATIONS

Search Report appended to an Office Action, which was issued to Taiwanese counterpart application No. 111122025 (by the TIPO on Oct. 24, 2022), with an English translation thereof.

*Primary Examiner* — Taelor Kim
*Assistant Examiner* — Manuel Hernandez
(74) *Attorney, Agent, or Firm* — Rosenberg, Klein & Lee

(57)     ABSTRACT

A wall of a building includes a wall body that is recessed to form multiple installation spaces, and a water supply unit that is disposed inside the wall body, and that includes multiple water pipes connected to the installation spaces and multiple actuated valves mounted to the water pipes. Each of the actuated valves, when opened, allows flow of water supplied via one of the water pipes to an installation space. The wall further includes a power supply circuit and multiple power units. Each of the power units includes a power storage module, a battery management system, and an emergency module. The battery management system controls a corresponding actuated valve to open when an operating value is higher than a predetermined value. The emergency module controls the corresponding actuated valve to open when the emergency module loses connection to the battery management system.

5 Claims, 4 Drawing Sheets

(51) Int. Cl.

| | |
|---|---|
| *E04B 2/00* | (2006.01) |
| *E04C 2/52* | (2006.01) |
| *H01M 10/63* | (2014.01) |
| *H02J 7/80* | (2026.01) |
| *H02J 7/90* | (2026.01) |
| *H02J 9/06* | (2006.01) |
| *H02J 7/34* | (2006.01) |

(52) U.S. Cl.
CPC ............... _H01M 10/63_ (2015.04); _H02J 7/80_ (2026.01); _H02J 7/90_ (2026.01); _H02J 9/06_ (2013.01); *H02J 7/342* (2020.01)

(58) Field of Classification Search
CPC ...... H02J 7/80; H02J 7/90; E04B 1/94; E04C 2/46; E04C 2/521; H01M 10/63
USPC ........................................................ 320/150
See application file for complete search history.

(56) References Cited

U.S. PATENT DOCUMENTS

| | | | |
|---|---|---|---|
| 2018/0171638 A1* | 6/2018 | Kostos ................ | H01M 50/227 |
| 2021/0053461 A1* | 2/2021 | Shiraishi ................. | B60L 58/18 |
| 2023/0313602 A1* | 10/2023 | Zhou ......................... | E06B 9/15 |
| | | | 160/133 |
| 2024/0162521 A1* | 5/2024 | Seibert .................... | B60L 58/26 |
| 2026/0066393 A1* | 3/2026 | Kwak ................. | H01M 10/613 |

FOREIGN PATENT DOCUMENTS

| | | | | | |
|---|---|---|---|---|---|
| CN | 114148174 A | * | 3/2022 | ............ | B60L 3/0084 |
| WO | WO-2019016663 A1 | * | 1/2019 | ............. | E04C 2/526 |

* cited by examiner

WALL OF A BUILDING INCLUDING A WATER SUPPLY UNIT FOR A PLURALITY OF POWER UNITS

CROSS-REFERENCE TO RELATED APPLICATION

This application claims priority to Taiwanese Invention Patent Application Ser. No. 111122025, filed on Jun. 14, 2022.

FIELD

This disclosure relates to a wall, and more particularly to an interior wall of a building capable of power storage.

BACKGROUND

Generally, in a building, considering the power demand of electrical equipment such as lamps, power lines are pre-arranged inside a wall of the building, and are connected to external interfaces such as sockets and distribution boards so as to provide electric power to the electrical equipment that are connected to the external interfaces. However, with technology advancing, equipment requiring electricity are becoming increasingly diverse, and forms of power supply thereto increasingly broader (e.g., electric vehicle charging, wireless charging, IoT device power supply, etc.). The conventional approach of connecting a plug to a socket can no longer satisfy such growing need. Considering that the wall pre-built into the building is more difficult to modify, an uninterruptible power supply (UPS) or other large scale power storage equipment is generally mounted outside the wall so as to meet the need from equipment with unconventional, larger power consumption.

Yet, since specifications and shape of the aforementioned UPS are often standardized and the UPS generally occupies much space so that it may store more power, it is difficult to be integrated with design of an interior space of a room, resulting in considerable limitations on utilization and aesthetics of the space. In addition, having equipment with high power consumption installed inside the building may generate waste heat, which may lead to short circuit and cause safety concerns.

SUMMARY

Therefore, an object of the disclosure is to provide a wall that can alleviate at least one of the drawbacks of the prior art.

According to the disclosure, the wall of a building includes a wall body that is recessed to form a plurality of installation spaces therein, a water supply unit that is disposed inside the wall body, and that includes a plurality of water pipes respectively connected to the plurality of installation spaces and a plurality of actuated valves respectively mounted to the plurality of water pipes. Each of the plurality of actuated valves, when opened, allows flow of water supplied via a respective one of the plurality of water pipes to a corresponding one of the plurality of installation spaces. The wall further includes a power supply circuit that is disposed inside the wall body, and a plurality of power units that are respectively disposed in the plurality of installation spaces, and that are respectively and communicatively connected to the plurality of actuated valves of the water supply unit. Each of the plurality of power units includes a power storage module electrically connected to the power supply circuit, and a battery management system electrically connected to the power supply circuit, communicatively connected to the power storage module, and configured to monitor an operating value of the power storage module. The battery management system controls a corresponding actuated valve to open when the operating value is higher than a predetermined value, where the corresponding actuated valve is one of the plurality of actuated valves that corresponds to one of the plurality of installations spaces in which the power unit is disposed. Each of the plurality of power units further includes an emergency module connected to the battery management system, and including a power supply that is independent from the power supply circuit. The emergency module is configured to control the corresponding actuated valve to open when the emergency module loses connection to the battery management system.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
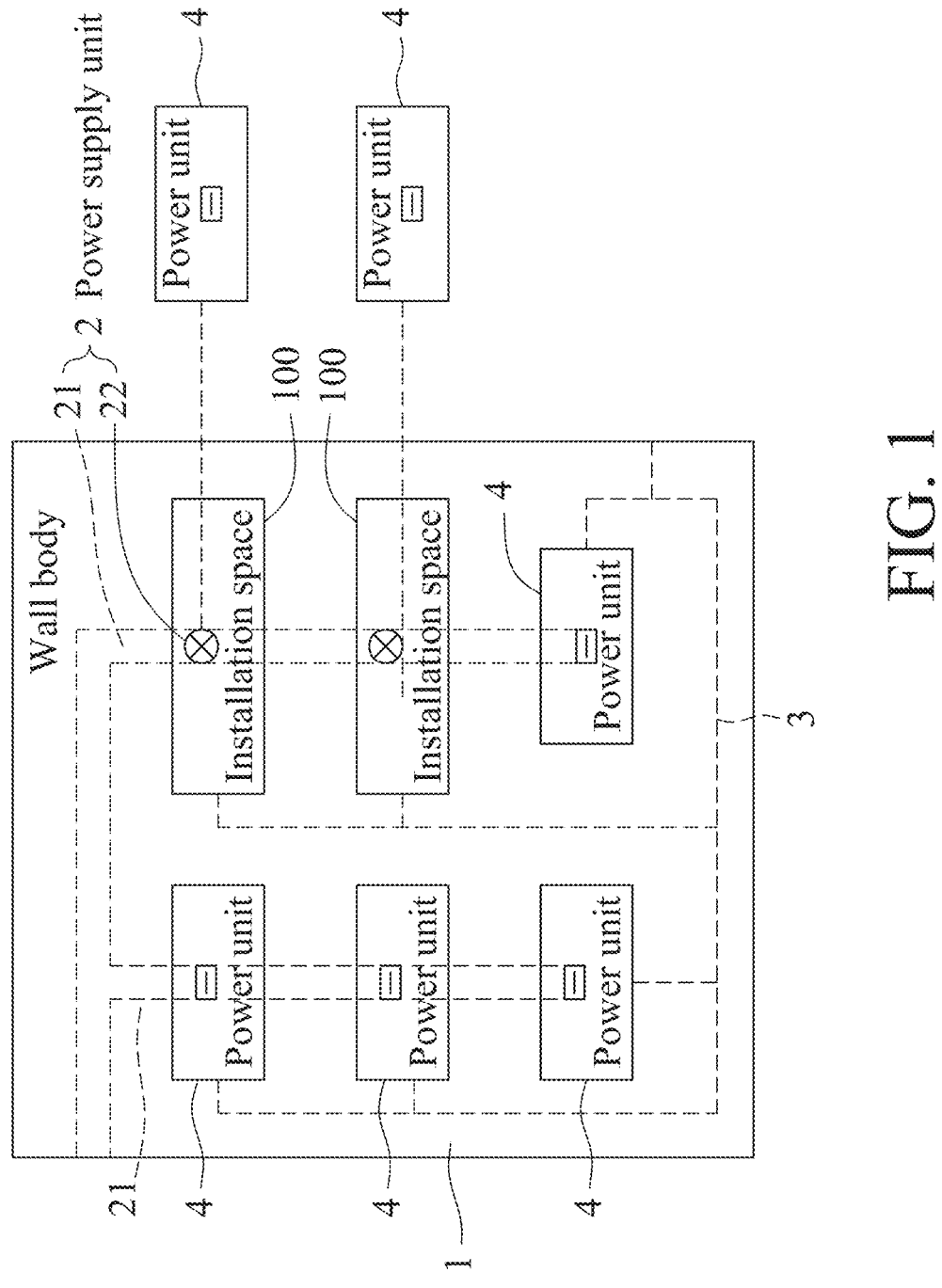
FIG. 1 is a schematic diagram illustrating an embodiment of a wall of a building according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a wall of a building according to the disclosure is provided, in which the wall includes a wall body 1 that is recessed to form a plurality of installation spaces 100 therein, a water supply unit 2 that is disposed inside the wall body 1, a power supply circuit 3 that is disposed inside the wall body 1, and a plurality of power units 4 that are respectively disposed in the plurality of installation spaces 100. Specifically, the wall body 1 is made of a fireproof and waterproof material, and has a sturdy structure for constituting the wall that provides enough support for the building. In some embodiments, the wall is an interior wall of the building. However, in other embodiments, the wall may be an exterior wall of the building, where the exterior wall separates an interior of the building from the outside, and the interior wall is a wall within the building and surrounded by exterior walls.

The water supply unit 2 includes a plurality of water pipes 21 respectively connected to the plurality of installation spaces 100, and a plurality of actuated valves 22 respectively mounted to the plurality of water pipes 21. Specifically, the water supply unit 2 may be water pipes or fire sprinkler pipes planned for the building. Each of the plurality of actuated valves 22, when opened, allows flow of water supplied via a respective one of the plurality of water pipes 21 to a corresponding one of the plurality of installation spaces 100 (i.e., the installation space to which the respective one of the plurality of water pipes 21 is connected). It should be noted that, since the wall body 1 is made of a waterproof material, even if water is introduced into one of the plurality of installation spaces 100, a structure of the wall body 1 may remain unaffected and water may not permeate through the wall body 1 into other installation spaces 100.

Figure 2:
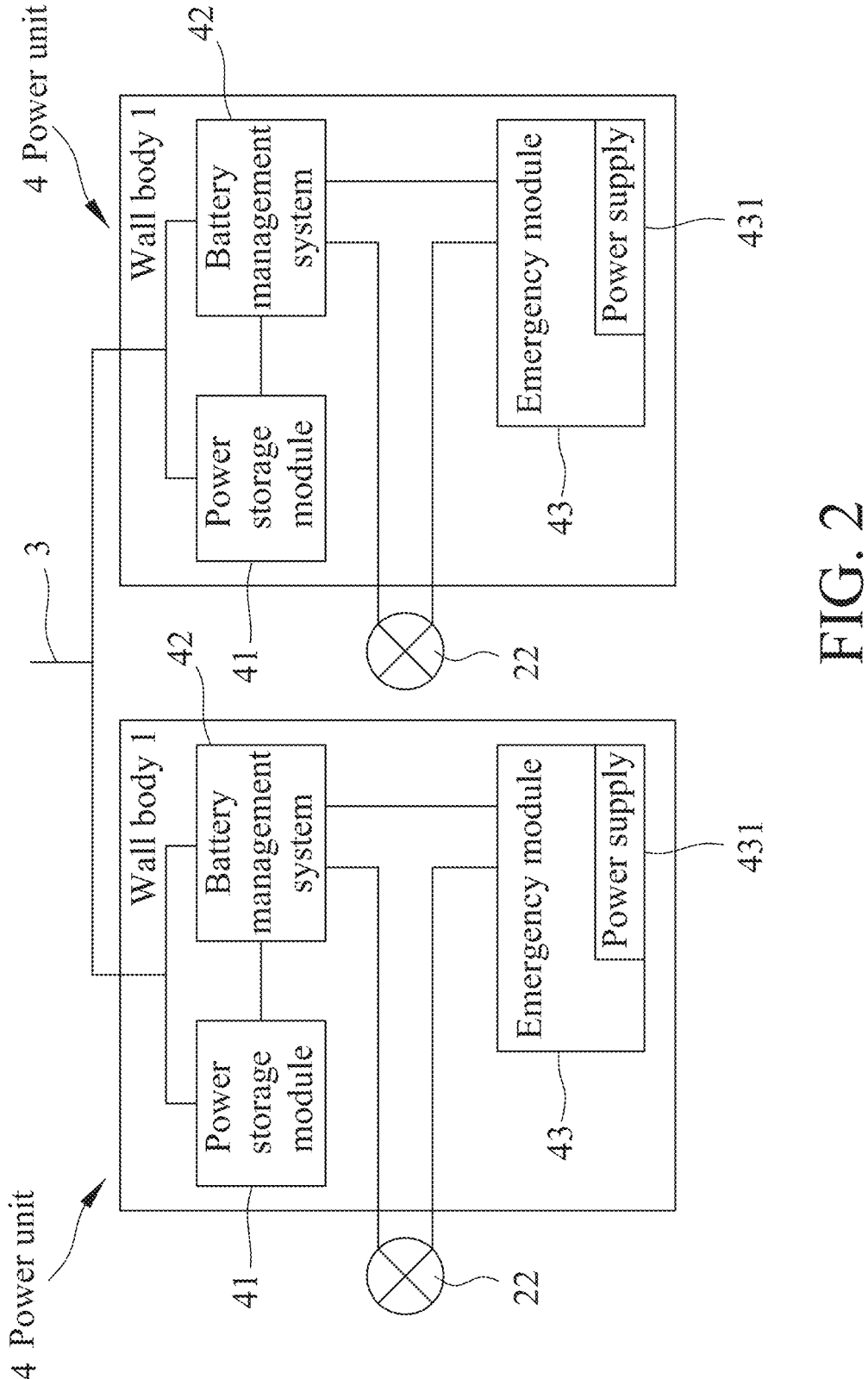
FIG. 2 is a block diagram illustrating an embodiment of a plurality of power units according to the present disclosure.

Referring to FIGS. 1 and 2, each of the plurality of power units 4 is manufactured modularly to fit dimensions of the installation spaces 100, and may be in the form of a plate, so as to be integrated into the wall body 1. In addition, because of the modular design of the plurality of power units 4 and the plurality of installation spaces 100, the plurality of power units 4 are respectively embedded in the plurality of installation spaces 100 to seal openings of the plurality of installation spaces 100, and to enable the plurality of installation spaces 100 to be watertight. The plurality of power units 4 are also respectively and communicatively connected to the plurality of actuated valves 22. Each of the plurality of power units 4 includes a power storage module 41 that is electrically connected to the power supply circuit 3, a battery management system 42 that is electrically connected to the power supply circuit 3 and is communicatively connected to the power storage module 41, and an emergency module 43 that is connected to the battery management system 42. Specifically, the power storage module 41 is a battery that is connected to the power supply circuit 3, and that is used to store electric power from the power supply circuit 3. In some embodiments, the power storage module 41 is a lithium battery, and specifications thereof may be 48V 200 Ah or the like to meet specific power requirements. In some embodiments, the battery management system 42 is electrically connected to the emergency module 43, and applies a non-zero voltage to the emergency module 43 when the battery management system 42 operates normally. In some embodiments, the battery management system 42 is communicatively connected to the emergency module 43, and continuously transmits a live signal to the emergency module 43 when the battery management system 42 operates normally.

In some embodiments, each of the battery management system 42 and the emergency module 43 is implemented by one of an integrated circuit, a microchip, a microprocessor, a microcontroller and combinations thereof that is able to carry out functions mentioned in this disclosure.

The battery management system 42 is configured to monitor an operating value of the power storage module 41, and the operating value may be an operating temperature of the power storage module 41. In this scenario, the battery management system 42 may include a temperature sensor (not shown) that measures the operating temperature of the power storage module 41. Taking one of the plurality of power units 4 as an example, when the battery management system 42 operates normally and when the operating value of the power storage module 41 is higher than a predetermined value (i.e., the operating temperature of the power storage module 41 is too high), the power storage module 41 may be under an abnormal circumstance, i.e., occurrence of abnormality such as electrical overload or a short circuit. To immediately eliminate dangers that may result from a continued operation of the power storage module 41 under such abnormal circumstance, the battery management system 42 then controls a corresponding actuated valve to open when the operating value is higher than the predetermined value.

The corresponding actuated valve is one of the plurality of actuated valves 22 that is communicatively connected to the power unit 4 and that corresponds to one of the plurality of installations spaces 100 in which the power unit 4 is disposed. At this time, water is supplied to the corresponding one of the plurality of installation spaces 100 via the respective one of the plurality of water pipes 21, so as to cool down the operating temperature of the power storage module 41 or even extinguish fire via such water cooling mechanism.

In addition, if the battery management system 42 is affected by the abovementioned abnormality and fails to operate, the emergency module 43, which includes a power supply 431 that is independent from the power supply circuit 3, is configured to respond timely by controlling the corresponding actuated valve to open when the emergency module 43 loses connection to the battery management system 42. Considering that abnormalities such as a short circuit or fire in a circuit system may be unforeseeable and happen suddenly, when the emergency module 43 loses connection to the battery management system 42, such abnormalities may have already occurred. At this time, to immediately respond to the absence of the battery management system 42, which fails to operate, the emergency module 43 is configured to control the corresponding actuated valve to open. The corresponding actuated valve allows flow of water supplied via the respective one of the plurality of water pipes 21 to the corresponding one of the plurality of installation spaces 100, thereby forming a backup mechanism of safety protection. In some embodiments, in the aforementioned scenario where the battery management system 42 is electrically connected to the emergency module 43, the emergency module 43 determines that the connection is lost when the non-zero voltage applied by the battery management system 42 to the emergency module 43 drops to zero. In some embodiments, in the aforementioned scenario where the battery management system 42 is communicatively connected to the emergency module 43, the emergency module 43 determines that the connection is lost when the live signal is not received from the battery management system 42.

Figure 3:
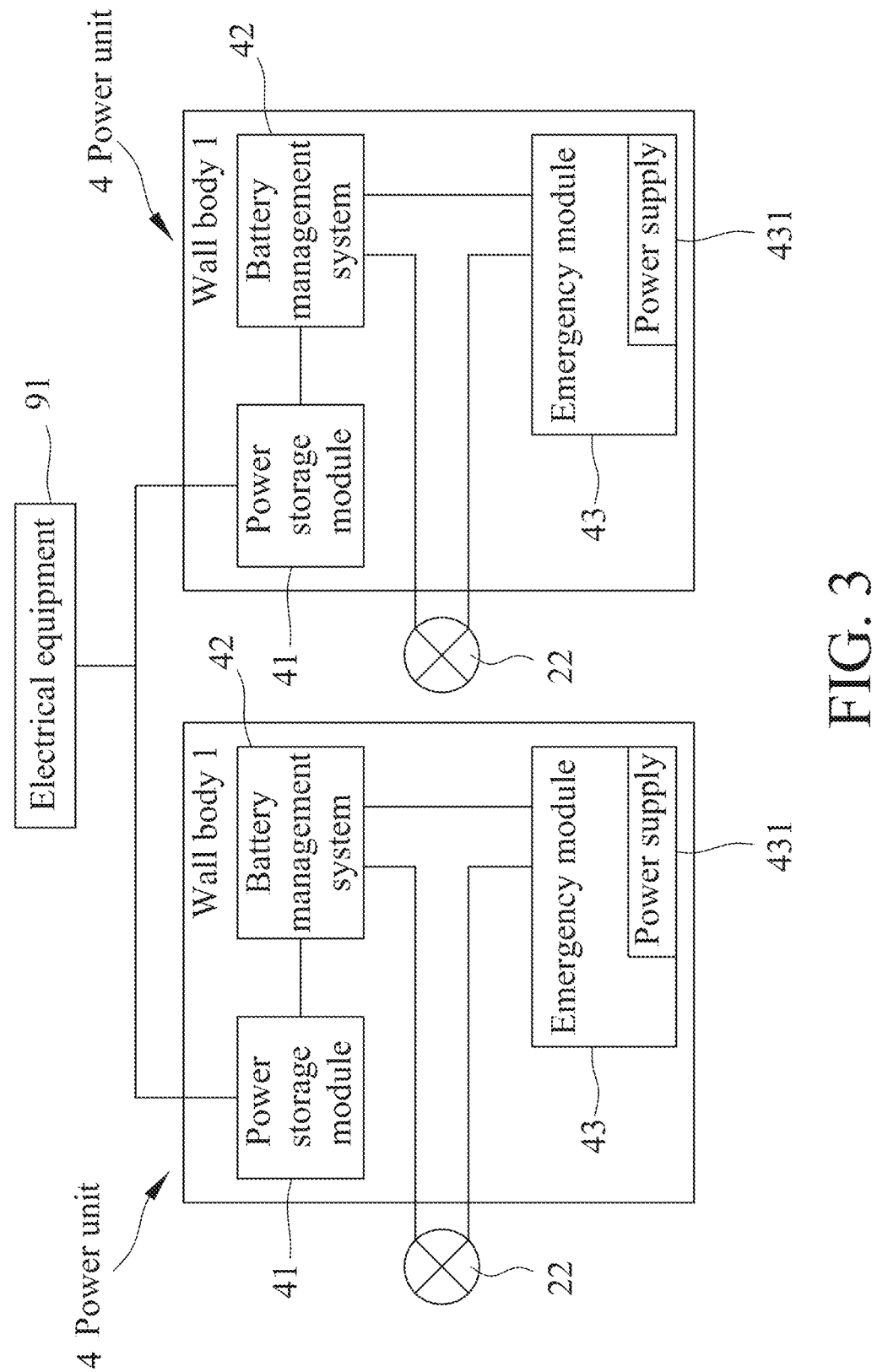
FIG. 3 is a block diagram similar to FIG. 2, illustrating an embodiment in which two power units are connected in parallel to meet power demand of an electrical equipment.
Figure 4:
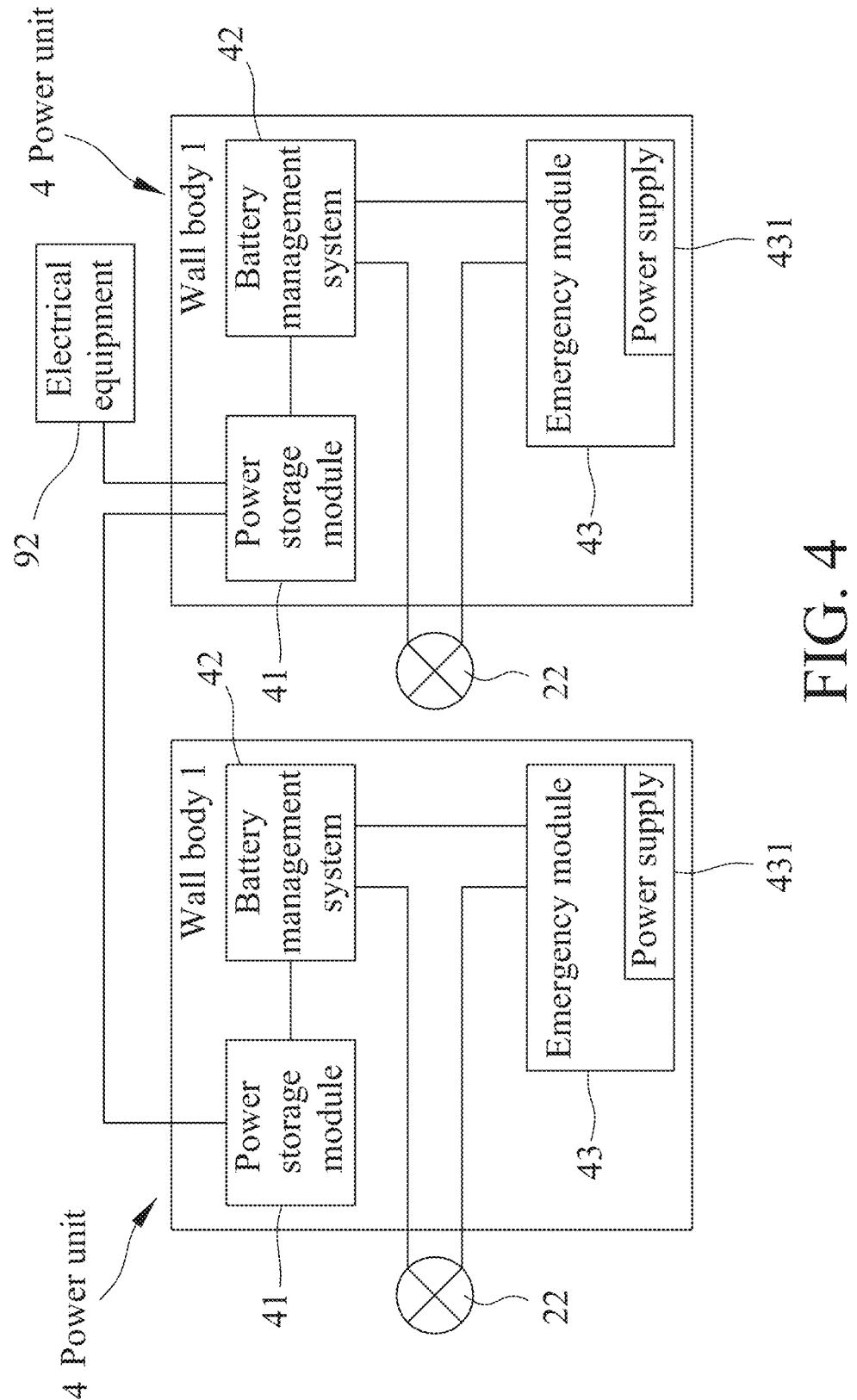
FIG. 4 is a block diagram similar to FIG. 2, illustrating another embodiment in which two power units are connected in series to meet power demand of an electrical equipment.

Referring to FIGS. 3 and 4, although specifications of the power storage module 41 of each of the plurality of power units 4 are fixed, to meet the diverse needs of power consumption from various electrical equipment, two power storage modules among the power storage modules 41 respectively of the plurality of power units 4 may be connected in parallel and be connected to an electrical equipment 91 as shown in FIG. 3. In other embodiments, two power storage modules among the power storage modules 41 respectively of the plurality of power units 4 are connected in series, and another electrical equipment 92 is directly connected to one of the two power storage modules as shown in FIG. 4. In addition, according to different specifications of the electrical equipment 91, 92, more than two power storage modules 41 may be connected in parallel or in series to supply electricity, or a combination of parallel connection(s) and series connection(s) of more than two power storage modules 41 may be adopted so as to meet the diverse needs of power consumption from various electrical equipment.

In summary, by virtue of disposing the plurality of power units 4 in the plurality of installation spaces 100 of the wall body 1, an adverse effect on the design of an interior space of a room may be avoided, and connections between the power storage modules 41 may be freely arranged so as to meet the diverse demand of power consumption from various equipment. In addition, with respect to each of the plurality of power units 4, by virtue of the battery management system 42 and the emergency module 43, the corresponding actuated valve is controlled to open so as to allow water to be supplied to the corresponding one of the plurality of installation spaces 100 when abnormalities occur, such as when the operating value (e.g., the operating temperature) of the power storage module 41 is higher than the pre-determined value or when the emergency module 43 loses connection to the battery management system 42, in order to cool down the operating temperature of the power storage module 41 or even extinguish fire and thereby achieve safety protection.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A wall of a building comprising:

a wall body that is recessed to form a plurality of installation spaces therein;

a water supply unit that is disposed inside said wall body, and that includes a plurality of water pipes respectively connected to said plurality of installation spaces and a plurality of actuated valves respectively mounted to said plurality of water pipes, each of said plurality of actuated valves, when opened, allowing flow of water supplied via a respective one of said plurality of water pipes to a corresponding one of said plurality of installation spaces;

a power supply circuit that is disposed inside said wall body; and a plurality of power units that are respectively disposed in said plurality of installation spaces, and that are respectively and communicatively connected to said plurality of actuated valves of said water supply unit, each of said plurality of power units including a power storage module electrically connected to said power supply circuit, a battery management system electrically connected to said power supply circuit, communicatively connected to said power storage module, and configured to monitor an operating value of said power storage module, said battery management system controlling a corresponding actuated valve to open when the operating value is higher than a predetermined value, where said corresponding actuated valve is one of said plurality of actuated valves that corresponds to one of said plurality of installations spaces in which said power unit is disposed; and an emergency module connected to said battery management system, and including a power supply that is independent from said power supply circuit, said emergency module configured to control the corresponding actuated valve to open when said emergency module loses connection to said battery management system, wherein said wall is an interior wall of said building, and wherein said power supply maintains operation of said emergency module when said emergency module loses connection to said battery management system.

2. The wall as claimed in claim 1, wherein said wall body is made of a fireproof and waterproof material.

3. The wall as claimed in claim 1, wherein for each of said plurality of power units, the operating value monitored by said battery management system includes operating temperature of said power storage module.

4. The wall as claimed in claim 1, wherein at least two power storage modules among said power storage modules respectively of said plurality of power units are connected in parallel.

5. The wall as claimed in claim 1, wherein at least two power storage modules among said power storage modules respectively of said plurality of power units are connected in series.

* * * * *